Patented July 10, 1945

2,379,913

UNITED STATES PATENT OFFICE 2,379,913

RECOVERY OF RARE SUGARS

Louis Laufer and Jesse Charney, New York, N. Y., assignors to Schwarz Laboratories Inc., New York, N. Y., a corporation of New York No Drawing. Application August 7, 1942, Serial No. 454,022

32 Claims. (Cl. 260—209)

The present invention relates essentially to processes of treating nucleoside bearing substances and is more especially concerned with the recovery of rare pentoses such as d-ribose therefrom.

As conducive to a clear understanding of the invention, it is noted that in the process of preparing d-ribose from nucleic acid, whether by alkaline pressure or enzymic hydrolysis and the isolation of various nucleosides from each other (such for instance as adenosine in the form of its picrate and guanosine), preparatory to recovery of the pentose therefrom, complications ensue because these substances tend to adsorb impurities by reason of their gelatinous character. The process of hydrolyzing the individual nucleosides once they have been segregated from each other and the splitting off of pentose therefrom is moreover complicated and difficult. The yield derived by resort to such processes at best would be relatively low and the procedure of refinement thereof cumbersome and costly.

It is among the objects of the present invention to provide a simple process that eliminates the need for elaborate purification and by which valuable products in refined form including rare pentose as such, a typical and important example of which is d-ribose and valuable purines or derivatives thereof, may be derived in good yield from those organic complexes of biologic tissue that contain nucleic acid, purine nucleotides and purine nucleosides.

Another object is to provide a process for the recovery of d-ribose or kindred pentose from purine nucleosides, without resort to picric acid, without the need for segregating and for treating each of the purine nucleosides separately, and without the need for elaborate purification, various nucleosides admixed in the product as derived from yeast nucleic acid for instance, being treated together, readily to remove the pentose concurrently in one sequence of operations from all of them.

Another object is to provide a process for expeditiously separating from highly complex aggregates of biologic tissue, purine nucleosides or purines of that particular type that has an unsubstituted No. 7 position in the purine group.

According to the present invention in one of its aspects the splitting of the purine nucleoside into purine or purine derivative on the one hand and d-ribose or kindred pentose on the other, is readily effected by a series of separations which utilize the formation of insoluble cuprous salts of the purine nucleosides. The cuprous salts of purine nucleosides are believed to be a new chemical compound and are claimed herein as such. Such salts are readily separated and cleaned and thereupon the pentose is separated by hydrolysis from the cuprous salt of the purine that comes down as an insoluble precipitate, leaving the pentose in solution with but small amounts of impurities. These impurities are in large part removed by precipitation, upon addition of a suitable alkalizing agent. The pentose, substantially free of impurities, is then recovered by known methods of concentration and crystallization.

To form the cuprous salts of the purine nucleosides according to the present invention, there is added under controlled temperature and pH to a solution bearing free nucleosides, copper compound and an acid, one and one only of such added compounds being a reducing agent. Cuprous ions are therefore present in the solution, which will react in such acid medium to form the desired insoluble cuprous salts of purine nucleosides.

In one embodiment copper sulphate or equivalent cupric salt may be used in conjunction with sulphurous ions, derived for instance from sulphurous acid or a salt thereof, the two ingredients being supplied either together or consecutively to the solution. The sulphurous ions convert much of the copper into the cuprous form for the desired purpose.

Alternatively, cuprous oxide may be used together with sulphuric acid. In that case the sulphuric acid medium appears in some way, perhaps by catalytic action, to promote the combination of the cuprous salt with the nucleoside.

In both of the alternatives there is present a copper cation in cuprous form and a sulphurous anion.

The precipitation of cuprous salts of purine nucleoside proceeds rapidly and substantially quantitatively and the precipitate is sufficiently insoluble to assure substantially maximum yield of the purine nucleoside, such as purine riboside, from which impurities can readily be removed by washing. The washing should be conducted under conditions that will inhibit oxidation, desirably in the presence of some reducing substance such as sulphurous acid or its salts. Were the washing performed with ordinary distilled water, the cuprous salt would gradually become oxidized to split off cupric hydroxide, and the nucleosides thus liberated would dissolve in the wash water with loss of yield.

The action set forth appears to be highly selective with respect to certain purine compounds including purines as such, that is purines devoid of a side chain, and purine derivatives, that is purines that have a side chain attached thereto. The action serves to segregrate by precipitation those compounds having the purine nucleus but in which the number 7 position is unsubstituted, leaving in solution almost all of the pyrimidines and the purine compounds, the nucleus of which has a substituted number 7 position. Accordingly, the process set forth affords a mechanism claimed herein, for precipitating such valuable purines, as for instance, theophylline, from other purines or derivatives thereof, as for instance, caffeine, that may be present in the mixture as well as from pyrimidines or derivatives thereof all of which will remain in solution.

According to the invention the precipitated cuprous salts of the purine nucleosides are washed and then hydrolyzed in acid medium at elevated temperature, to split substantially completely and quantitively into the free pentose such as d-ribose and the cuprous salts of the respective purine bases.

The need for segregating the various nucleosides such for instance as guanosine and adenosine and for separately treating the same to split off the pentose is entirely obviated by the present invention.

The cuprous salts of the purine bases are highly insoluble and can therefore be removed readily from the hydrolyzate by filtration or centrifugation, leaving in solution the split off pentose along with excess copper, inorganic salts and small amounts of organic impurities. These extraneous materials can be largely removed by the addition to the solution of sufficient hydroxide or oxide of an alkaline earth metal to bring the solution to near the neutral point under which condition insoluble salts of copper and alkaline earth sulphates and sulphites precipitate from the solution along with a large part of the organic impurities and coloring matter. After removing these impurities by suitable mechanical means the residual solution containing substantially the pure pentose may then be concentrated, decolorized and the sugar crystallized according to known procedure.

In the foregoing general description there have been set forth the generic features of the invention as applied to the preparation of d-ribose or kindred pentose from ribose or pentose bearing substances such as nucleic acid, the purine nucleosides and the like.

Preferred controls of such process as applied to the recovery of d-ribose from yeast nucleic acid will now be set forth in somewhat greater detail.

By methods known to those skilled in the art, yeast nucleic acid is first hydrolyzed to form its respective nucleosides.

The filtered hydrolyzate thus freed from the phosphate constituents of the nucleic acid is acidified, desirably with sulphuric acid substantially to slightly above neutrality and brought to a temperature between 25 degrees C. and 100 degrees C., desirably close to the boiling point. The solutions of cupric salt such as copper sulphate and sulphurous ion, desirably as sodium acid sulphite solution are added, the latter in an amount in excess of that quantity required to reduce all of the copper added.

Alternatively, the cuprous salts such as sulphates, chlorides, oxides and the like are added in solution or in aqueous suspension as the case may be, together with sulphuric acid. The reaction should be carried on with sufficient sulphuric acid, to bring the pH down to less than 3.

As a result of the foregoing process the precipitate of the cuprous salts of the purine nucleosides derived from yeast, namely cuprous guanosine and cuprous adenosine form rapidly. The copper compound in either procedure should be in amount sufficient to provide an excess for the quantitative precipitation of all of those purine nucleosides present that are capable of being precipitated thereby.

The order of addition of the copper salts and the acid may be reversed in either procedure without affecting the final result, the order being a matter of convenience.

After further cooling, the precipitated salts of the nucleosides are separated from the solution as for instance by centrifugation and are washed by cold water containing small amounts of sulphurous acid or its salts, desirably about one per cent, to prevent oxidation of the cuprous salts, which is to be avoided as the cupric salts tend to redissolve and a loss of yield would ensue. The hydrolyzate recovered as filtrate and the washings added thereto, which contains the pyrimidine nucleosides and derivatives thereof may be treated to recover the pentose therefrom by methods that are no part of the present invention.

The cuprous salts after washing are suspended in from 10 to 20 parts of water and are acidified desirably with sulphuric acid of 0.2 to 2.0 normal strength. The suspension is now refluxed for approximately one hour at substantially boiling temperature, thereby to split off from the cuprous salts of nucleosides their component pentoses such as d-ribose and leaving insoluble cuprous purines in suspension. The hydrolyzed suspension is centrifuged or filtered. The solid residue after washing consists of the cuprous salts of the purine bases, i. e., guanine and adenine, substantially free of impurity and from these the corresponding purines may be recovered by processes that are no part of the present invention.

The filtrate and washings containing the d-ribose in solution are refined by treatment with barium, calcium, or other alkaline earth hydroxide or oxide, until the pH of the solution is between 6.5 and 8.5 under which conditions copper hydroxide, insoluble alkaline earth salts, coloring matter and organic impurities come down as precipitates which may be removed by filtration or centrifugation, leaving chiefly d-ribose in solution. Thereupon, by usual methods, that solution may be decolorized with carbon, concentrated and taken up with suitable organic solvents to remove remaining traces of impurities, after which d-ribose of satisfactory purity is crystallized directly.

Although it is believed that the foregoing description is sufficient to enable those skilled in the art to practice the invention, more specific directions for the recovery of d-ribose from yeast nucleic acid will now be given to insure complete compliance with the statutory requirements.

By methods known to the art the phosphates are first split off from the nucleotides present in the nucleic acid, to convert the same into the nucleosides. To this end, by way of example, 150 grams of approximately 85 per cent pure nucleic acid derived from yeast may be hydrolyzed for about four hours at 145 degrees C. in an autoclave with 24 grams of magnesium oxide or with equivalent amounts of other alkali in mild solution, such as ammonium, sodium or calcium hydroxide. The hydrolyzate is then filtered hot and the residue washed with hot distilled water to give a filtrate volume of about two liters. The precipitated residue consisting of magnesium or other phosphate, and oxide together with impurities is discarded.

The filtrate kept hot near its boiling point of 102 to 103 degrees C. is first treated with acid, preferably substantially to neutrality (pH 6.0 to 7.5) but the process is operative if the pH be as high as 8.5 or as low as 3.0, or even 2.0. The filtrate is then treated with a solution containing 66 grams of copper sulphate and another solution containing 30 grams of sodium acid sulphite to yield a solution of pH which is between 3.0 and 6.5 at substantially boiling temperature. An immediate precipitation of the cuprous salts of the purine nucleosides occurs, that is, in the case of the yeast nucleic acid, a mixture of cuprous adenosine and cuprous guanosine.

The precipitate containing the cuprous adenosine and cuprous guanosine is filtered off and washed until the washings are colorless. The washed cuprous salts are now suspended in 1250 ml. of 1 normal sulphuric acid and hydrolyzed by refluxing at the boiling point for about one hour. By this operation the pentose in this instance d-ribose, is liberated into the solution and the cuprous salts of the purines, namely adenine and guanine, remain in suspension. The suspended matter is filtered off and thoroughly washed and the washings are added to the filtrate.

The filtrate which may have a volume of approximately 2 liters will consist of d-ribose, sulphuric acid, some dissolved copper, a slight amount of dissolved purines and minute amounts of other impurities. Most of the impurities are precipitated out by treating the filtrate with either barium hydroxide or lime which are added until the pH has been raised to 6.5 to 7.0. In this manner insoluble barium or calcium sulphate, insoluble cuprous and cupric hydroxide and insoluble purines are formed and are separated from the solution by filtration. The precipitate is thoroughly washed with distilled water, the filtrate and the washings are combined and will contain chiefly d-ribose.

The filtrate may now be treated with 5 grams of activated carbon at 70 degrees C. for 15 minutes, filtered and then concentrated to a syrup under vacuum. The syrup is now taken up in about 250 ml. of absolute ethyl alcohol. In this step most of the inorganic and organic impurities are precipitated, leaving practically pure d-ribose in solution. The alcoholic d-ribose solution is now placed in a vacuum desiccator and in a few days pure d-ribose crystallizes out in a good yield with a melting point of 75 degrees C. By re-solution in alcohol and ether and recrystallization, pure d-ribose crystals are yielded with a melting point of 87 degrees C. In this manner a rich recovery of d-ribose is garnered, which is between 15 and 23 per cent of the weight of impure nucleic acid used as the starting material.

It will be readily understood that the procedure above set forth may be applied not only for the preparation of pure d-ribose, but of other pentoses of the type found incorporated in the 9 position in nucleotides or nucleosides. Among such sugars are rhamnose, xylose, arabinose and desoxy-ribose. Among the types of nucleotides and nucleosides and substances bearing the same, are not only nucleic acid, but such substances as thymonucleic acid, inosinic acid, inosine, xanthylic acid xanthosine, crotonside and like substances that may serve as the source of pentose according to the present invention.

As many changes could be made in the above process and composition and many apparently widely different embodiments of this invention could be made without departing from the scope of the claims, it is intended that all matter contained in the above description shall be interpreted as illustrative and not in a limiting sense.

We claim:

1. The process which consists in treating solutions of nucleoside bearing substances with a copper compound and an acid which conjointly afford cuprous ions, with resultant precipitation of substantially insoluble cuprous salts of nucleosides, and separating and washing said precipitate.

2. The process recited in claim 1 in which the insoluble cuprous salts of nucleosides are maintained in a weak reducing medium to guard against oxidation and re-solution thereof.

3. The process which consists in treating solutions of organic substances that contain purine nucleosides with cuprous ions in an acid medium with the resultant selective separation in the form of a precipitate of those purine nucleosides that have an unsubstituted No. 7 position in the purine group.

4. The process of separating purine nucleosides from pyrimidine nucleosides comprising the treatment of solutions of mixed nucleosides containing said substances with cuprous ion in the presence of cupric ion, thereby to precipitate cuprous salts of the purine nucleosides while the pyrimidine nucleosides present remain in solution.

5. The process which consists in treating with cuprous ions in an acid medium solutions of organic substances that contain pyrimidines and compounds having a purine nucleus in which the number 7 position is unsubstituted, with the resultant selective separation in the form of a precipitate of those purine compounds that have an unsubstituted No. 7 position in the purine group, while the pyrimidines and derivatives thereof remain in solution.

6. The process of separating purine compounds with unsubstituted No. 7 position from purine compounds with substituted No. 7 position, which consists in treating solutions of organic complexes bearing both said types of purine compounds with cuprous ions in an acid medium, with the resultant selective separation in the form of a precipitate of those purine compounds that have an unsubstituted No. 7 position in the purine group.

7. The process recited in claim 6 in which the purine compounds separated out are purines devoid of side chain.

8. The process recited in claim 6 in which the purine compounds separated out are nucleosides.

9. The process of separting theophylline with unsubstituted No. 7 position from caffeine with substituted No. 7 position, which consists in treating solutions containing said two purines with cupric ion in the presence of a reducing agent in acid form, and thereby selectively precipitating insoluble cuprous salt of the theophylline while leaving the caffeine in solution.

10. The process of preparing sugars, comprising the treatment of purine nucleoside bearing substances with copper compound and an acid which conjointly afford cuprous ions that selectively combine chemically with those purine nucleosides that have an unsubstituted No. 7 position, isolating the cuprous salts thus formed and splitting off the sugars therefrom.

11. The process of preparing rare pentoses comprising the treatment of purine nucleoside bearing substances with cuprous ions, selectively to precipitate cuprous salts of those purine nucleosides that have an unsubstituted No. 7 position in the purine group, hydrolizing the precipitate and then removing the purine bases from the hydrolyzate in the form of cuprous salts and recovering the pentoses from the filtrate.

12. The process of preparing refined pentoses from purine nucleoside bearing substances that contain the same, which consists in treating said substances with cuprous ions, to form insoluble cuprous salts of the purine nucleosides present therein, separating the precipitate of such salts, suspending the same in an acid medium and hydrolyzing the same to obtain from such cuprous salts insoluble cuprous salts of purine bases and the free pentose, separating the precipitate and refining and crystallizing the pentose from the filtrate.

13. The process of preparing refined pentoses, which consists in adding cuprous ions in an acid medium at controlled temperature to solutions bearing free purine nucleoside, with the resultant precipitation of cuprous salts of those of the purine nucleosides present which form insoluble salts and then spliting the precipitate into cuprous salts of the purine bases and free pentoses and separating and refining the latter.

14. The process of preparing refined pentoses, which consists in adding copper sulphate and a reducing agent at high temperature, to solutions bearing free purine nucleoside with unsubstituted No. 7 position until a precipitate of cuprous salts of purine nucleosides has formed, separating the precipitate while maintaining the same free from oxidizing influence, hydrolyzing the same in acid to precipitate out insoluble cuprous purines and recovering the pentose from the filtrate.

15. The process of recovering refined pentose, which consists in treating purine nucleoside bearing substances under heat with cuprous oxide and sulphuric acid, separating from the filtrate the insoluble cuprous purine nucleoside precipitate thereby formed, hydrolyzing said precipitate in sulphuric acid at boiling temperature and finally recovering the pentose from the filtrate and refining said pentose.

16. The process of preparing rare sugars from the treatment of hydrolysates of purine nucleoside bearing substances, which consists in adding cupric cation in conjunction with sulphurous anion, isolating the copper salts of the purine nucleosides thereby precipitated, washing said salts under conditions which inhibit oxidation, hydrolyzing said precipitated copper salts of the purine nucleosides, filtering off the copper salts of purines and crystallizing the sugar from the residual solution.

17. The process of preparing pentose, comprising the treatment of purine nucleoside bearing substances at pH 2.0 to 8.5 with copper compound and an acid which conjointly afford cuprous ions, thereby to isolate the insoluble cuprous salts of the purine nucleosides, washing such salts in manner to prevent oxidation, hydrolyzing said insoluble cuprous salts in acid solution at boiling temperature, filtering off the cuprous purines, neutralizing with alkali, concentrating the residual sugar solution to small volume and crystallizing the sugar therefrom.

18. The process of preparing rare sugars, comprising the treatment of solutions of purine nucleoside bearing substances at near boiling temperature, and at pH 2.0 to 8.5 with copper cation and oxide of sulphur anion of which only one is in the reducing form, isolating the resultant precipitate of insoluble cuprous salts of the purine nucleosides, washing the salts in a manner which inhibits oxidation, hydrolyzing said cuprous purine nucleosides in dilute acid by boiling in the neighborhood of one hour, cooling and removing the resulting precipitate of insoluble cuprous purine base and recovering the sugar from the filtrate.

19. The process of preparing sugars from solutions containing sugars combined with purines which consists in treating the sugar bearing substance with copper sulphate solution in conjunction with solutions of sulphurous acid or salts thereof at pH 3.0 to 8.5 at or near boiling temperatures followed by cooling, thereby to isolate cuprous salts of purine nucleosides, washing such salts with cold dilute solutions containing sulphurous ions, hydrolyzing the purified cuprous purine nucleoside in approximately one normal sulphuric acid by boiling for one hour followed by cooling and removal of insoluble cuprous purines therefrom, adjusting the filtrate to pH 6.5 to 8.5 with a material selected from the group consisting of the oxides and hydroxides of the alkaline earth metals, removing the precipitate so formed and recovering substantially pure sugars from the filtrate.

20. The process of preparing sugars from solutions containing the same combined with purines which consists in adding cuprous salts and sulphuric acid thereto, thereby to precipitate cuprous purine nucleosides, washing such salts with cold dilute solutions containing sulphurous ions, hydrolyzing the substantially pure cuprous nucleosides thus obtained in one normal sulphuric acid at boiling temperatures for one hour followed by removal of insoluble cuprous purines therefrom, adjusting the filtrate to pH 6.5 to 8.5 with a material selected from the group consisting of the oxides and the hydroxides of the alkaline earth metals, removing the precipitate so formed and the recovery of substantially pure sugars from the filtrates.

21. The process of preparing d-ribose which consists in treating nucleosides from yeast nucleic acid with copper sulphate solution in conjunction with sulphurous ions, to yield a solution of pH 3.0 to 6.5 at substantially boiling temperature, followed by cooling thereby to precipitate the cuprous salts of adenosine and guanosine therefrom, washing such salts with cold dilute solutions containing sulphurous ions to prevent oxidation and re-solution while removing impurities, hydrolyzing the washed salts by boiling for approximately one hour in 0.2 to 2.0 normal sulphuric acid solution, removing insoluble cuprous salts of guanine and adenine, neutralizing the filtered hydrolyzate with a material selected from the group consisting of barium and calcium hydroxide and oxide to pH 6.5 to 8.5 to remove residual copper sulphate and impurities, filtering, further purifying the filtrate with activated carbon, and recovering substantially pure d-ribose from the filtrate.

22. The process of preparing d-ribose from ribosides of purines, which consists in treating riboside solutions with copper sulphate solution in the presence of sulphurous ions to yield a solution of pH 3.0 to 6.5 at substantially boiling temperature followed by cooling, thereby to precipitate cuprous purine ribosides, washing such salts with cold dilute solutions containing sulphurous ions to prevent oxidation and re-solution while removing impurities, hydrolyzing the washed salts by boiling for approximately one hour in normal sulphuric acid solution, removing the insoluble cuprous purines thus formed, neutralizing the filtered hydrolyzate with a substance selected from the group consisting of barium and calcium oxide and hydroxide to pH 6.5 to 8.5 to remove residual copper sulphate, sulphite and organic impurities, filtering, further purifying the filtrate with carbon and recovering substantially pure d-ribose from the filtrate.

23. The process of preparing d-ribose from ribosides of purines, which consists in treating riboside solutions with cuprous salts and sulphuric acid at a temperature between 25 degrees C. and the boiling point of the solution followed by cooling, thereby to precipitate cuprous purine ribosides, washing such salts with cold dilute solutions containing sulphurous ions to prevent oxidation and re-solution while removing impurities hydrolyzing said cuprous purine ribosides, filtering, and crystallizing the d-ribose from the filtrate.

24. The process of preparing cuprous salts of purine nucleosides, comprising the treatment of purine nucleoside bearing substances to release free nucleosides therein, adding to the solution thus formed copper sulphate solution in conjunction with solutions containing sulphurous ions to yield a solution of pH 3.0 to 6.5 and temperature between 25 degrees C. and the boiling point of the solution followed by cooling and washing of the cuprous purine nucleosides thereby precipitated with cold dilute solutions containing sulphurous ions to prevent oxidation and re-solution.

25. The process of preparing cuprous salts of purine nucelosides comprising the treatment of purine nucleoside bearing substances to release free nucleosides therein, adding to the solution thus formed cuprous salts and sulphuric acid at temperature between 25 degrees C. and the boiling point of the solution, followed by cooling, washing of the precipitate of cuprous nucleosides thereby formed with cold dilute solutions containing sulphurous ions to prevent oxidation and re-solution and the recovery of the purified cuprous purine nucleosides therefrom.

26. The process of purification of sugar solutions containing purines, which consists in treating the solution for removal of the purines as insoluble cuprous salts followed by the elimination from the filtrate of excess copper sulphates, sulphites, inorganic salts and small amounts of organic impurities by addition of a material selected from the group consisting of calcium and barium hydroxide and oxide until the pH is 6.5 to 8.5, filtration, concentration of the filtrate and crystallization of substantially pure sugar therefrom.

27. The process of purifying d-ribose solutions containing purines, which consists in treating such solutions for the removal of the purines as insoluble cuprous salts followed by the elimination from the filtrate of excess copper, sulphates, sulphites, inorganic salts and organic impurities by addition of a material selected from the group consisting of calcium and barium hydroxide and oxide until the pH is 6.5 to 8.5, filtration, concentration of the filtrate and crystallization of substantially pure d-ribose therefrom.

28. The process of preparing d-ribose from substances containing nucleosides that include some or all of xanthosine, inosine, guanosine, adenosine and crotonside, which consists in treating solutions of such nucleosides with copper sulphate solution in conjunction with solutions containing sulphurous ions to yield a solution of pH 3.0 to 6.5 at substantially boiling temperature followed by cooling, thereby to precipitate cuprous purine ribosides, washing such salts with cold dilute solutions containing sulphurous ions to prevent oxidation and re-solution while removing impurities, hydrolyzing the washed salts by boiling for approximately one hour in 0.2 to 2.0 normal sulphuric acid solution, removing the insoluble cuprous purines thereby formed, neutralizing the filtered hydrolyzate to pH 6.5 to 8.5 with a material selected from the group consisting of barium and calcium oxide and hydroxide, to remove residual copper sulphate, sulphite and organic impurities therefrom, filtering, further purifying the filtrate with carbon and recovering substantially pure d-ribose from the filtrate.

29. The process of preparing d-ribose from substances containing ribo-nucleosides that include some or all of xanthosine, inosine, guanosine, adenosine, and crotonside, which consists in treating solutions containing these ribo-nucleosides with cuprous salts and sulphuric acid at pH of approximately 3, and at a temperature between 25 degrees C. and the boiling point of the solution, followed by cooling, thereby to precipitate cuprous purine ribosides, washing such salts with cold dilute solutions containing sulphurous ions to prevent oxidation and re-solution while removing impurities, hydrolyzing said cuprous purine ribosides, filtering, and crystallizing the d-ribose from the filtrate.

30. A composition consisting of a mixture of substantially pure cuprous salts of purine nucleosides that have an unsubstituted No. 7 position.

31. A composition consisting of a mixture of substantially pure cuprous guanosine and cuprous adenosine.

32. The process of obtaining substantially pure cuprous purines from a solution bearing free nucleosides, which consists in adding copper in the cuprous form in an acid medium to such nucleosides, and hydrolyzing in an acid medium the precipitate of cuprous nucleosides thereby obtained to split off the sugar therefrom, leaving a precipitate of the desired cuprous purines.

LOUIS LAUFER.
JESSE CHARNEY.